United States Patent [19]

Cordeiro

[11] Patent Number: 4,557,048

[45] Date of Patent: Dec. 10, 1985

[54] TOOL FOR ASSEMBLING INSULATED CONNECTOR

[75] Inventor: August V. Cordeiro, East Greenwich, R.I.

[73] Assignee: Electric Terminal Corporation, Warwick, R.I.

[21] Appl. No.: 512,650

[22] Filed: Jul. 11, 1983

[51] Int. Cl.[4] ........................ H01R 43/04; B23P 19/02

[52] U.S. Cl. ........................................ 29/863; 29/753

[58] Field of Search ................. 29/857, 859, 863, 858, 29/566.2, 809, 754, 753, 517

[56] References Cited

U.S. PATENT DOCUMENTS 3,537,167 11/1970 Lawson ............................ 29/858 X
3,609,860 10/1971 Hills ..................................... 29/859
3,673,299 6/1972 Robins .............................. 29/517 X
4,139,937 2/1979 L'Homme ............................. 29/754
4,214,361 7/1980 Coldren et al. ........................ 29/863
4,272,879 6/1981 Wigby et al. ...................... 29/863 X
4,335,497 6/1982 Casey ................................ 29/753 X
4,426,772 1/1984 Collier et al. ..................... 29/863 X

*Primary Examiner*—Howard N. Goldberg
*Assistant Examiner*—Carl J. Arbes

[57] ABSTRACT

A tool for automatically assembling electrical terminals with a box insulator comprising a piston-activated jaws assembly for securing a wire in place in a work station so that press-driven tools can crimp the wire to a metal connector, after which a piston-activated slide forces an insulated box over the metal connector and its crimped connection thereby completing the assembly.

10 Claims, 7 Drawing Figures

TOOL FOR ASSEMBLING INSULATED CONNECTOR

FIELD OF THE INVENTION

This invention relates to an automatic tool for assembling electrical terminals.

BACKGROUND OF THE INVENTION

Various types of electric terminals are well known in the art, and many have some type of metal connector which is crimped to the exposed end of a wire. In the most common of these terminals, the metal connector has a piece of insulation wrapped around its end into which the exposed portion of the wire is inserted for crimping. The crimped connection between the wire and the metal for these terminals is not always satisfactory, however, because the crimping tool must squeeze the metal through the surrounding semi-rigid insulation. Further, because the insulation is permanently attached to the connector before crimping, it is difficult to visually determine whether or not the crimp connections are good ones.

In another type of terminal, the metal connector has no insulation, and the crimping tool acts directly on the metal. This results in a better electrical connection between the metal and the wire, and it is a connection which can be visually inspected. After this connection has been made, a hollow box-like insulator is then slipped over the entire metal connector and the crimp connection, thereby providing protection for the entire connector. Despite these advantages, however, the box insulator terminals are hand assembled, and thus they are not widely used because of their cost.

SUMMARY OF THE INVENTION

I have discovered that a tool for assembling electrical terminals with box insulators can be constructed by providing piston means which sequentially and automatically retain wire in place for crimping, crimp the wire to a metal connector positioned in a work station, and slide the box insulator over the connector and the crimped connection, after which the finished terminal is removed and the tool automatically advances another connector and insulator to the work station for assembly.

In the preferred embodiment, the tool is a head attachment for an air-operated press. Once a metal connector and a box insulator are in a work station of the tool, the operator places the wire to be crimped into the connector. A first piston then moves a slide which locks a pair of mechanical jaws around the wire thereby holding it in place. Next the pistons of the press force a pair of crimping tools onto the connector and the wire and crimp them together. A second piston of the tool then moves another slide which pushes a box insulator over the entire metal connector and the crimped connection. Both slides are then retracted by the pistons, which releases the jaws holding the wire and the completed terminal and advances the next insulated box and metal connector into place into the work station to repeat the process.

DESCRIPTION OF THE PREFERRED EMBODIMENT

I turn now to a description of the preferred embodiment, after first describing the drawings.

STRUCTURE

Figure 1:
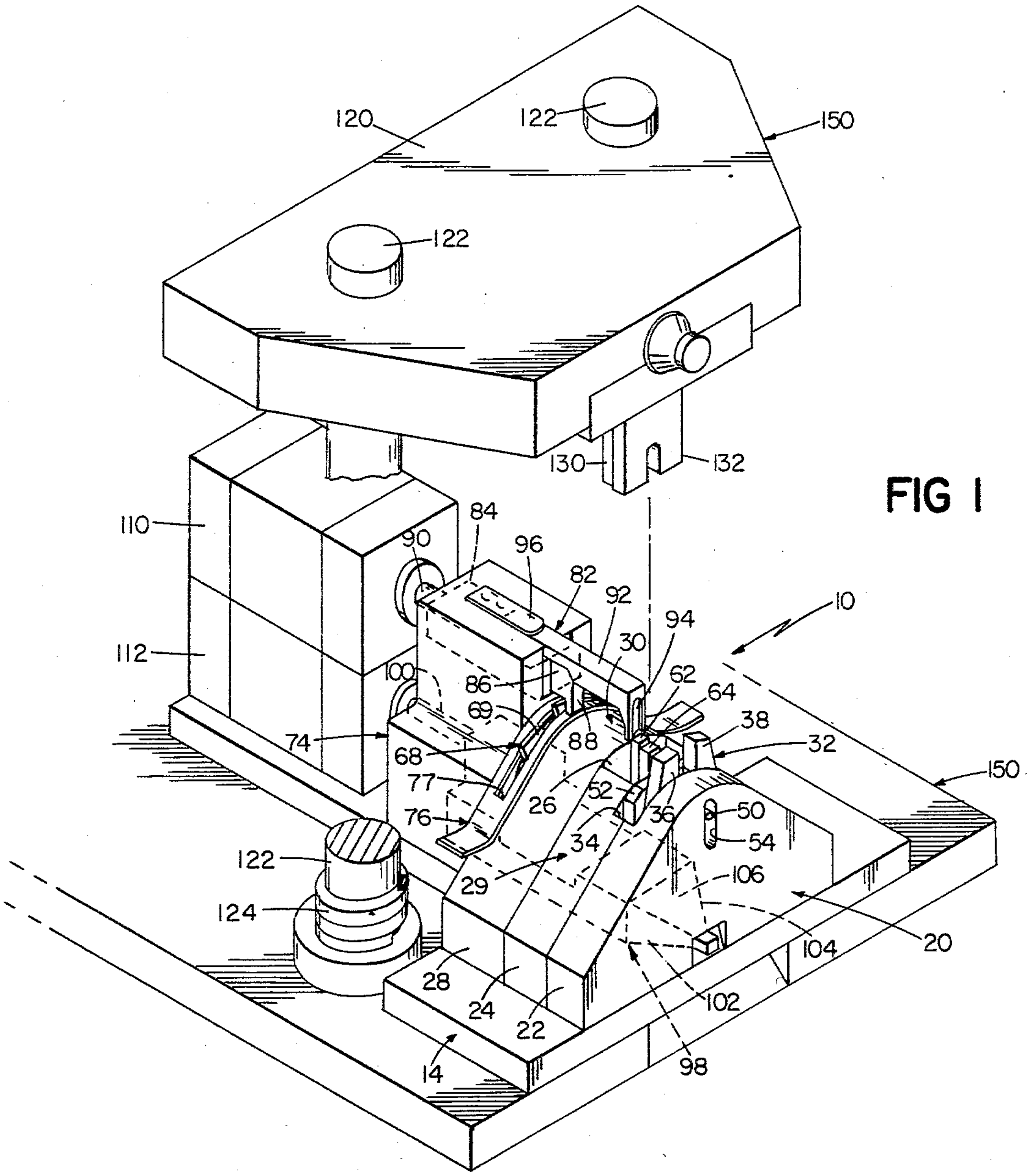
FIG. 1 is a perspective view of the tool of this invention.

Referring to FIG. 1, a tool for assembling an electrical terminal with a box insulator is shown at 10.

The tool 10 basically comprises a tool block 20, a slide housing 74 and first and second pistons, 110 and 112 respectively. The block 20, the slide housing 74 and the pistons 110, 112 are mounted on a T-shaped base plate 14 which is bolted (bolts not shown) to an air-operated press 150 of the type disclosed in my U.S. Pat. No. 4,195,565, incorporated herein by reference. The tool 10, however, may be used with other presses.

Figure 2:
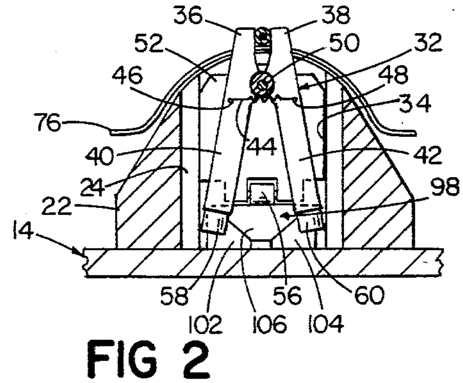
FIG. 2 is a cross-sectional view taken along lines 2—2 of FIG. 3.
Figure 3:
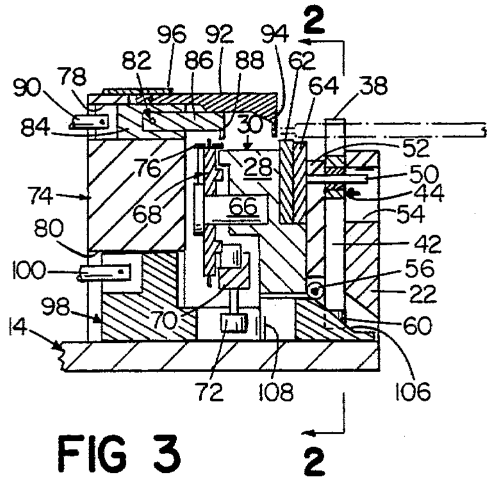
FIG. 3 is a cross-sectional view taken along lines 3—3 of FIG. 1.

The tool block 20 comprises a front cover 22, a pair of mid-sections 24, 26 and a rear plate 28, all bolted together to form a smooth, curved surface 29 having a work station 30 at its apex. The block 20 has a jaw assembly 32, a portion of which protrudes through slot 34 immediately in front of the work station 30. As best shown in FIGS. 2 and 3, the jaw assembly 32 comprises a pair of jaws 36, 38 having a corresponding pair of legs 40, 42, which legs are disposed inside the block 20. The legs 40, 42 are connected by a spring 44 attached to dowels 46, 48 on each leg. The jaws 36, 38 and legs 40, 42 are held together by a pivot pin 50 attached at one end to a slide plate 52. The opposite end of the pin 50 protrudes through a slot 54 in the front cover 22. Slide plate 52 has a roller 56 on its bottom edge, and each leg 40, 42 also has a roller 58, 60 on their ends opposite the jaws 36, 38. As will be explained hereinafter in more detail, the jaw assembly 32 can move up and down, and the legs 40, 42 can separate thereby opening the jaws 36, 38.

The mid sections 24, 26 of the block 20 support a wire anvil 62 and an insulation anvil 64, both immediately in front of the work station 30. The anvils 62, 64 are fixed in place.

As shown in FIG. 3, the rear plate 28 supports a shaft 66 for a sprocket wheel 68. The sprocket wheel 68 is connected to a ratchet and pawl assembly 70, which has roller bearing cam 72 extending downwardly therefrom.

The slide housing 74, which is immediately to the rear of the block 20, has a tape guide 76 with a slot 77. The slot 77 fits over spokes 69 of the sprocket wheel 68. The guide 76 is positioned above and separated from the curved surface 29 of the block 20. As shown in FIG. 3, slide housing 74 also has a top slot 78 and a bottom slot 80. The top slot 78 is positioned immediately to the rear of the work station 30, and it contains a slide assembly 82 having a carrier 84 and a projecting slide 86. The slide 86 has a pointed front face 88. The end of the carrier 84 opposite the slide 86 receives a shaft 90 from the first piston 110, and the slide assembly 82 can reciprocate in the slot 78.

A wire stop 92 is attached to the slide housing 74 above the slide assembly 82. The end of the wire stop 92 opposite the slide housing 74 has a flat face 94, which is normally positioned between the anvils 62, 64 and the work station 30. A spring clip 96 holds the wire stop 92 down.

The bottom slot 80 of the slide housing contains the jaw cam slide 98. One end of the jaw cam slide 98 is attached to a shaft 100 of the second piston 110. As best shown (dotted) in FIG. 1, the opposite end of the jaw cam slide 98 has two tapered side faces 102, 104 and a tapered top side 106. The rollers 58, 60 of the legs of the jaw assembly 32 contact the side faces 102, 104 while the roller 56 of the slide plate 52 contacts the top side 106. The jaw cam slide 98 also has a cam opening 108 into which roller bearing 72 for the ratchet and pawl assembly of the sprocket wheel 68 fits.

The pistons 110, 112 are connected to the air supply for the press 150. The press itself has, as shown in FIG. 1, an elevated tool holder 120 which is supported by rods 122 (only partially shown) each of which has a spring 124 (only a portion of one shown) to provide a return force. The holder 120 supports a wire roll tool 130 and an insulation roll tool 132 which are positioned directly above the anvils 62, 64.

OPERATION

Figure 4:
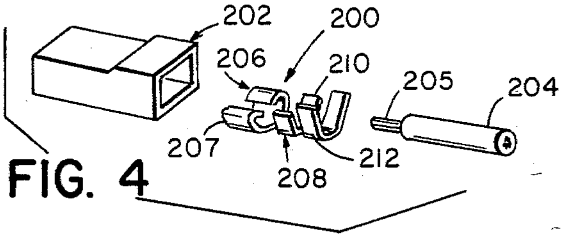
FIG. 4 is an exploded view of the terminal to be assembled by this invention.
Figure 5A:
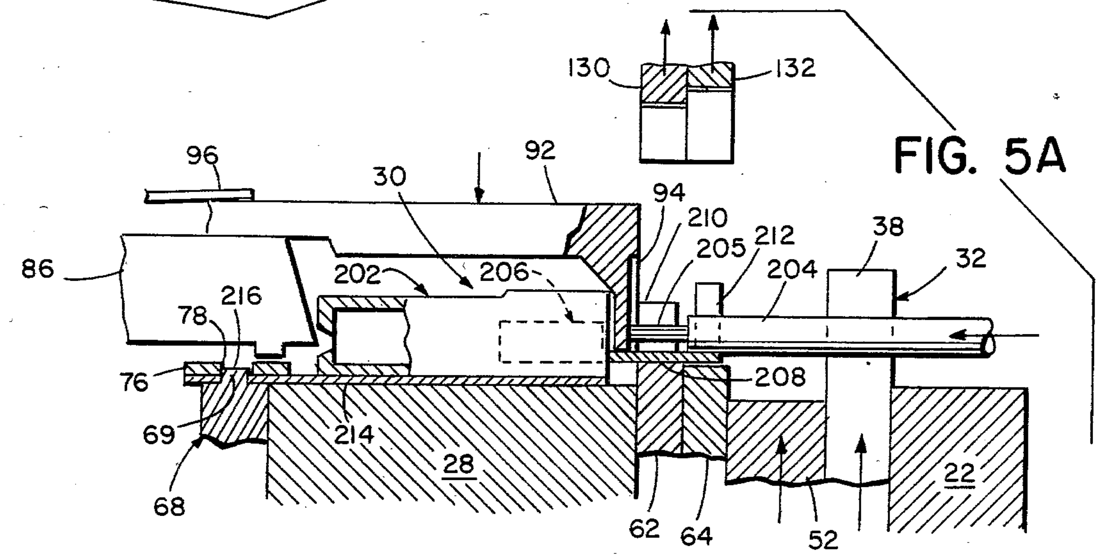
FIGS. 5 A, B, and C are side views of the sequence of operation of the tool of this invention.

The basic operation of the invention is best explained with reference to FIGS. 4 and 5. As shown in FIG. 4, the terminal to be assembled comprises a metal contact 200, a hollow insulation box 202 and a wire 204. The metal contact 200 has a contact section 206 with curled sides 207, and a rear tail 208. The tail 208, which is in the form of a trough, has a first pair of projections 210 and a second and larger pair of projections 212 at its rear. The contact section 206 is inserted into the hollow insulation box 202 leaving the tail 208 exposed, and the box is mounted with tape (not shown) on a film strip 214 having a series of slots 216.

In operation, the film strip 214 is slipped under the tape guide 76 so that the slots 216 engage the spokes 69 of the sprocket wheel 68. Then sprocket wheel 68 is rotated until the first box 202 with the contact tail 208 exposed is at the work station 30, as shown in FIG. 5A. In this position, the exposed tail 208 of the contact 200 is above the anvils 62, 64. In particular, the first pair of projections 210 are above the wire anvil 62 and the second and large projections 212 are above the insulation anvil 64.

In this position, the face 94 of the wire stop 92 is disposed between the box 202 and the first pair of projections 210. The operator then takes the wire 204 which has a small exposed end 205 and inserts it in the trough-like tail 208 of the contact 200 until the end 205 of the wire 204 hits the wire stop face 94. The wire 204 is then in position for crimping. The second piston 112 is then activated, and it pushes the jaw cam slide 98 forward. The rollers 58, 60 on the legs of the jaw assembly 32 slide along the tapered sides 102, 104 of the front of the jaw cam slide 98, and this opens the legs 40, 42, as shown in FIG. 2. This movement of the slide 98 also causes the jaw assembly slide plate 52 to roll up the tapered top side 106. This forward movement of the jaw cam slide 98 in effect causes the jaw assembly 32 to move upward out of the block 20 while closing the jaws 36, 38 around the wire just behind the tail 208 of the contact 200.

Figure 5B:
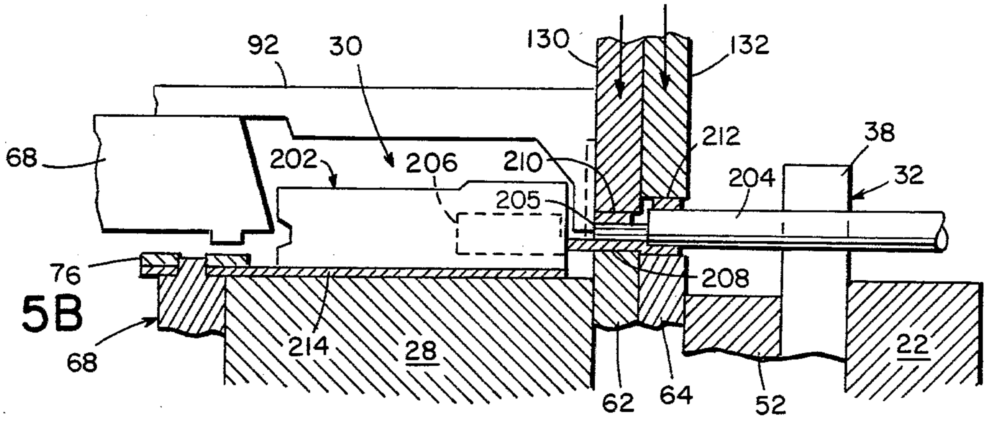
Figure 5C:
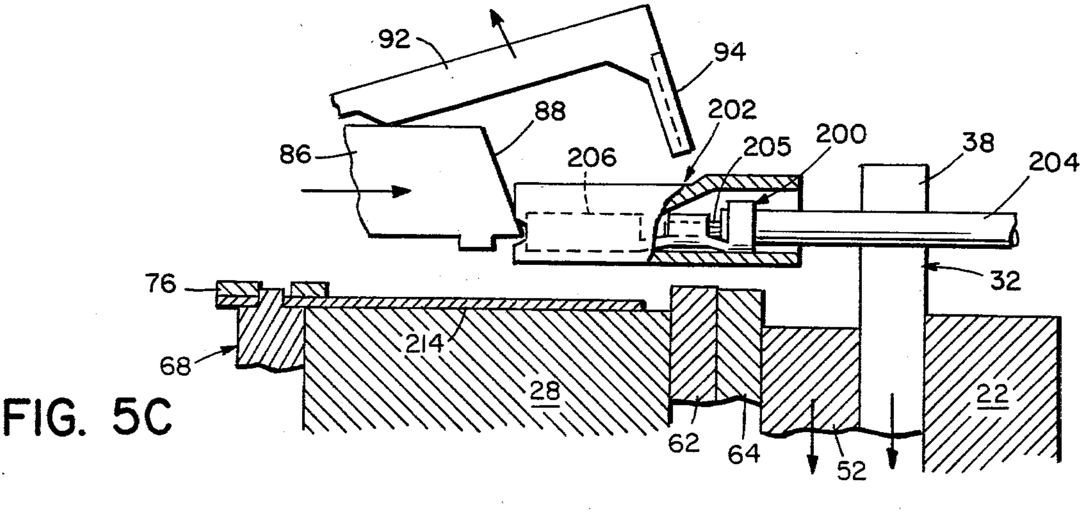

As shown in FIG. 5B, the press 150 then forces the holder 120 downward so that the tools 130, 132 pass over the anvils 62, 64, thereby bending the projections 210, 212 around the exposed wire 205 and the adjacent portion of the insulated wire 204. The holder 120 then retracts.

Finally, the first piston 110 pushes the slide assembly 82 forward. The movement of the slide 86 forces the wire stop 92 up and out of the way, and at the same time pushes the box 202 over the entire contact 200. The face 88 of the slide 86 also cuts away the tape holding the box 202 to the film. The slide is then retracted by piston 110. The terminal is now complete, and the second piston 112 retracts the jaw cam slide 98. The jaws 36, 38 release the wire 204 and the jaw assembly 32 drops back into the housing 20. The retraction of the jaw cam slide 98 also causes the roller bearing cam 72 to rotate in the cam opening 108, and the racket and pawl assembly 70 rotates thereby advancing the sprocket wheel 68 and moving the next unassembled box and contact into the work station.

Other embodiments of the invention will occur to those skilled in the art and are within the scope of the following claims.

What is claimed is:

1. A method of assembling an electrical terminal comprising:

positioning the parts of the terminal to be assembled in a work station;

inserting a wire to be crimped to a metal portion of the terminal into said work station;

securing the wire in place when it is properly positioned in said work station, crimping the wire to the metal portion of the terminal by forcing a roll tool over the metal portion and the wire, sliding an insulation box over the metal portion by means of a slide which reciprocates through said work station, and releasing the wire and the assembled terminal.

2. A tool for assembling an electrical terminal comprising:

a single work station for both crimping a metal portion of the terminal to a wire and attaching an insulated box over the metal portion after it has been crimped to the wire, said work station comprising a means for securing the wire in place for both crimping the metal portion of the terminal to the wire and for attaching the insulated box, said work station also comprising a crimping tool means, said crimping tool means disposed adjacent to said means for securing so as to crimp the metal portion of the terminal to the wire after it is secured in said work station, and a slide means, said slide means being located in said work station opposite said means for securing, whereby after said crimping tool means operates to crimp the metal portion of the terminal to a wire, said slide means reciprocates through said work station and pushes an insulated box over the metal portion thereby completing the assembly of the terminal.

3. The tool of claim 2 wherein said means for securing includes a jaw assembly having a pair of jaws, said jaws being activated by a first piston means and, when activated, selectively grasping and holding the wire which is to be crimped.

4. The tool of claim 1 wherein said work station includes a sprocket wheel for holding and advancing a film on which the metal portion and insulated box of the terminal are attached prior to assembly, said sprocket which being disposed between said slide means and said means for securing.

5. The tool of claim 2 wherein said crimping tool means comprises a first roll tool which is disposed above said work station and a driving means for supporting said first roll tool and selectively forcing said first roll tool down and over the metal portion of the terminal so that the metal portion is bent over and crimped to the wire.

6. The tool of claim 5 wherein said driving means comprises a tool holder of an air-driven press.

7. The tool of claim 5 wherein said crimping tool means includes a second roll tool disposed adjacent to said first roll tool, both said roll tools being disposed above an anvil means of said work station, which said anvil means is directly below the metal portion and the wire to be crimped.

8. The tool of claim 2 wherein said slide means includes a slide attached to a second piston means, said second piston means selectively forcing said slide across said work station whereby said slide forces the insulation box over the metal portion of the terminal.

9. The tool of claim 8 wherein said slide has a face which cuts the insulation box away from a film on which the box is supported in said work station.

10. The tool of claim 8 wherein said slide means further comprises a wire stop, said wire stop being disposed with respect to the metal portion of the terminal in said work station so that contacting said wire stop with the wire results in the wire being correctly positioned for crimping to the metal portion of the terminal.

* * * * *